US012574895B2

(12) United States Patent
Selvaganapathy et al.

(10) Patent No.: US 12,574,895 B2
(45) Date of Patent: Mar. 10, 2026

(54) WIRELESS TERMINALS WITH MULTIPLE SUBSCRIBER IDENTITY MODULES

(71) Applicant: NOKIA TECHNOLOGIES OY, Espoo (FI)

(72) Inventors: Srinivasan Selvaganapathy, Bangalore (IN); Alessio Casati, West Molesey (GB); Faranaz Sab, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 504 days.

(21) Appl. No.: 18/033,391

(22) PCT Filed: Oct. 15, 2021

(86) PCT No.: PCT/EP2021/078635
§ 371 (c)(1),
(2) Date: Apr. 24, 2023

(87) PCT Pub. No.: WO2022/084185
PCT Pub. Date: Apr. 28, 2022

(65) Prior Publication Data
US 2023/0413230 A1 Dec. 21, 2023

(30) Foreign Application Priority Data
Oct. 23, 2020 (IN) .............................. 202041046304

(51) Int. Cl.
*H04W 68/00* (2009.01)
*H04W 88/06* (2009.01)

(52) U.S. Cl.
CPC .......... *H04W 68/005* (2013.01); *H04W 88/06* (2013.01)

(58) Field of Classification Search
CPC ... H04W 68/005; H04W 88/06; H04W 8/205; H04W 28/0992; H04W 48/18; H04W 60/005; H04W 76/27; H04W 68/00
See application file for complete search history.

(56) References Cited

U.S. PATENT DOCUMENTS

2012/0069800 A1 3/2012 Soliman et al.
2018/0124659 A1 5/2018 Lee et al.
(Continued)

FOREIGN PATENT DOCUMENTS

EP 3 914 000 A1 11/2021
WO WO-2020147839 A1 * 7/2020 ........... H04W 68/02
(Continued)

OTHER PUBLICATIONS

International Search Report and Written Opinion corresponding to International Patent Application No. PCT/EP2021/078635, dated Jan. 27, 2022.
(Continued)

*Primary Examiner* — Christopher M Brandt
(74) *Attorney, Agent, or Firm* — Barta Jones, PLLC

(57) ABSTRACT

According to an example aspect of the present invention, there is provided a method comprising, transmitting, via a first subscriber identity module hosted by a wireless terminal, paging assistance information associated with a second subscriber identity module hosted by the wireless terminal to a core network node serving the second subscriber identity module, wherein said paging assistance information comprises information to be used to determine whether to page the second subscriber identity module when the first subscriber identity module is in connected mode and the second subscriber identity module is in idle mode and receiving, by the wireless terminal, a paging message from the core network node serving the second subscriber identity module in accordance with said paging assistance information when
(Continued)

the first subscriber identity module is in connected mode and the second subscriber identity module is in idle mode.

26 Claims, 6 Drawing Sheets

(56) References Cited

U.S. PATENT DOCUMENTS

| | | |
|---|---|---|
| 2018/0317200 A1 | 11/2018 | Kim et al. |
| 2019/0357295 A1 | 11/2019 | Kim et al. |
| 2020/0305118 A1 | 9/2020 | Ryu et al. |

FOREIGN PATENT DOCUMENTS

| | | |
|---|---|---|
| WO | 2020/186092 A2 | 9/2020 |
| WO | 2020/197695 A1 | 10/2020 |
| WO | 2020/209620 A1 | 10/2020 |

OTHER PUBLICATIONS

3GPP TR 23.761 V1.0.0 (Sep. 2020), 3rd Generation Partnership Project; Technical Specifcation Group Services and System Aspects; Study on system enablers for devices having multiple Universal Subscriber Identity Modules (USIM) (Release 17), 104 pages.

Hailu et al., "Hybrid paging and location tracking scheme for inactive 5G UEs", European Conference on Networks and Communications (EuCNC), Jun. 12-15, 2017, 6 pages.

Office action received for corresponding European Patent Application No. 21793926.3, dated Aug. 11, 2025, 4 pages.

* cited by examiner

MUSIM UE:
USIM-1 -> PLMN-1
USIM-2 -> PLMN-2

Figure 5:
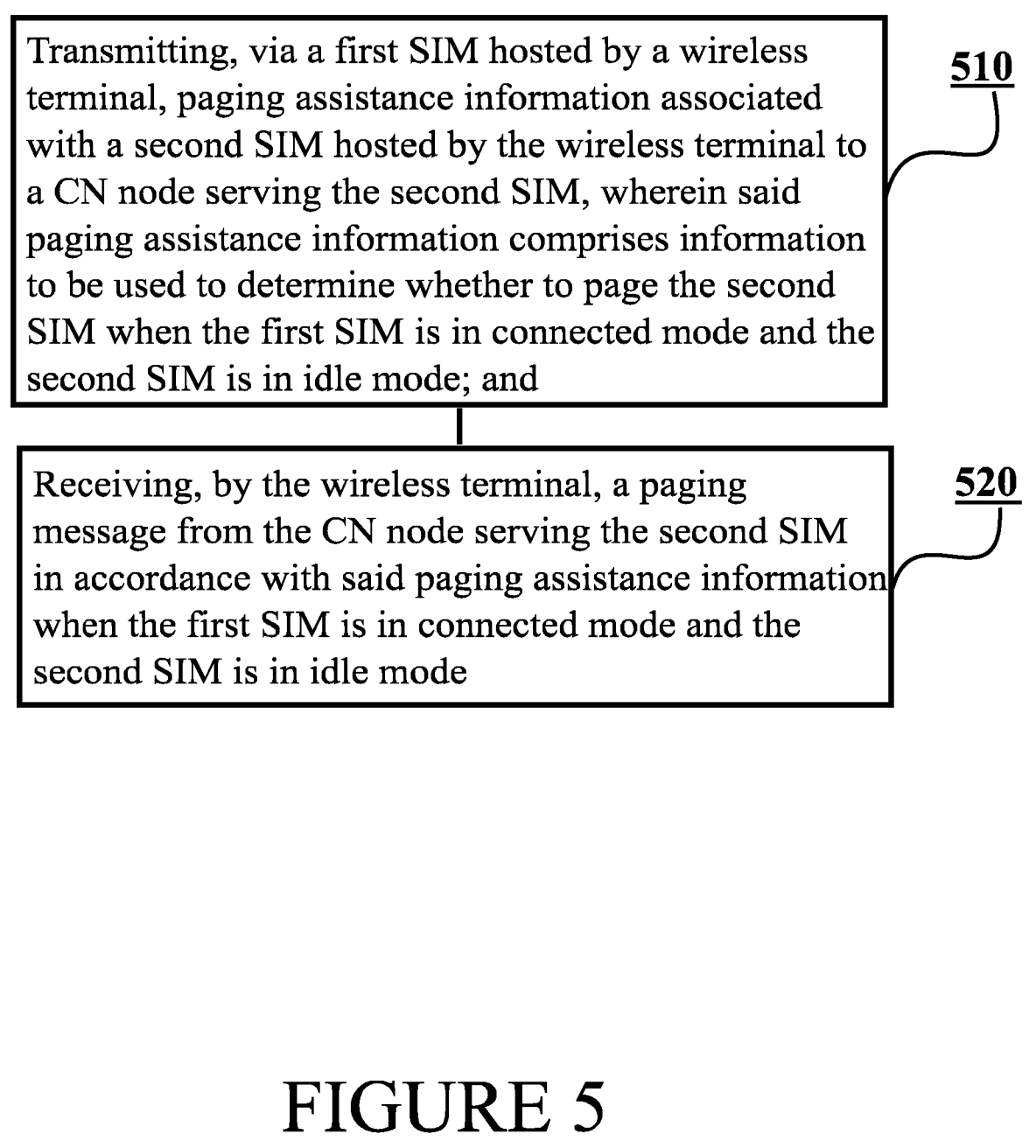

Transmitting, via a first SIM hosted by a wireless terminal, paging assistance information associated with a second SIM hosted by the wireless terminal to a CN node serving the second SIM, wherein said paging assistance information comprises information to be used to determine whether to page the second SIM when the first SIM is in connected mode and the second SIM is in idle mode; and

510

Receiving, by the wireless terminal, a paging message from the CN node serving the second SIM in accordance with said paging assistance information when the first SIM is in connected mode and the second SIM is in idle mode

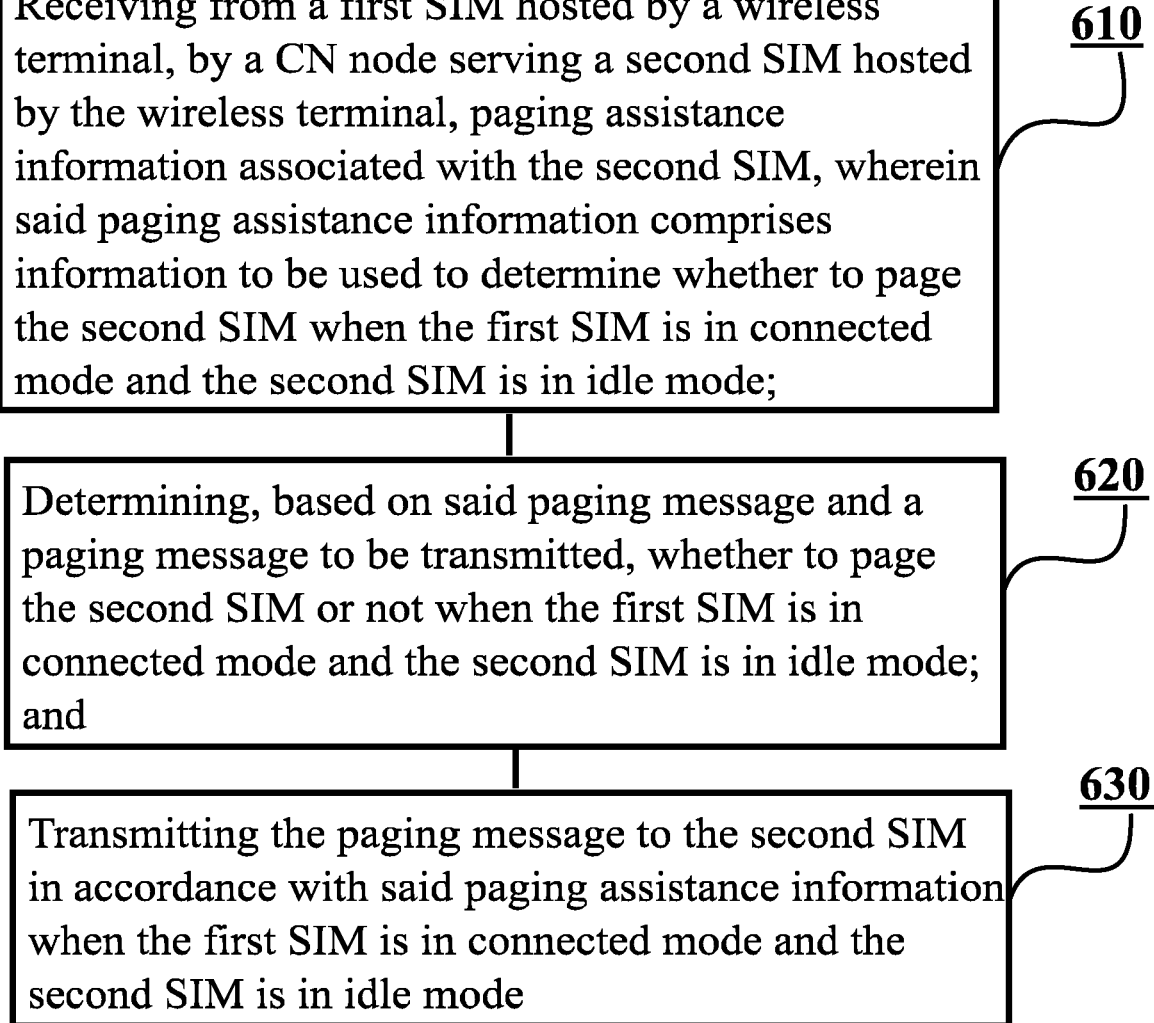

Receiving from a first SIM hosted by a wireless terminal, by a CN node serving a second SIM hosted by the wireless terminal, paging assistance information associated with the second SIM, wherein said paging assistance information comprises information to be used to determine whether to page the second SIM when the first SIM is in connected mode and the second SIM is in idle mode;

610

Determining, based on said paging message and a paging message to be transmitted, whether to page the second SIM or not when the first SIM is in connected mode and the second SIM is in idle mode; and

620

Transmitting the paging message to the second SIM in accordance with said paging assistance information when the first SIM is in connected mode and the second SIM is in idle mode

WIRELESS TERMINALS WITH MULTIPLE SUBSCRIBER IDENTITY MODULES

FIELD

Various example embodiments relate to wireless communications and more specifically to wireless terminals with multiple Subscriber Identity Modules, SIMs.

BACKGROUND

Wireless terminals with multiple SIMs may used in various cellular communication networks, such as, in cellular communication networks operating according to 5G radio access technology. 5G radio access technology may also be referred to as New Radio, NR, access technology. 3rd Generation Partnership Project, 3GPP, develops standards for 5G/NR and for other cellular communication networks. According to the 3GPP discussions, there is a need to provide enhanced methods, apparatuses and computer programs related to wireless terminals with multiple SIMS. Such enhancements may be exploited in other current cellular communication networks and in the future as well.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided an apparatus being configured at least to transmit, via a first subscriber identity module hosted by the apparatus, paging assistance information associated with a second subscriber identity module hosted by the apparatus to a core network node serving the second subscriber identity module, wherein said paging assistance information comprises information to be used to determine whether to page the second subscriber identity module when the first subscriber identity module is in connected mode and the second subscriber identity module is in idle mode and receive a paging message from the core network node serving the second subscriber identity module in accordance with said paging assistance information when the first subscriber identity module is in connected mode and the second subscriber identity module is in idle mode. The apparatus of the first aspect may be a wireless terminal or a control device configured to control the functioning thereof, possibly when installed therein.

According to a second aspect of the present invention, there is provided an apparatus being configured at least to receive, from a first subscriber identity module hosted by a wireless terminal, paging assistance information associated with a second subscriber module hosted by the wireless terminal, wherein said paging assistance information comprises information to be used to determine whether to page the second subscriber identity module when the first subscriber identity module is in connected mode and the second subscriber identity module is in idle mode, determine, based on said paging assistance information and a paging message to be transmitted, whether to page the second subscriber identity module or not when the first subscriber identity module is in connected mode and the second subscriber identity module is in idle mode and transmit the paging message to the second subscriber identity module in accordance with said paging assistance information when the first subscriber identity module is in connected mode and the second subscriber identity module is in idle mode. The apparatus of the second aspect may be a core network node or a control device configured to control the functioning thereof, possibly when installed therein.

According to a third aspect of the present invention, there is provided an apparatus comprising means for transmitting, via a first subscriber identity module hosted by a wireless terminal, paging assistance information associated with a second subscriber identity module hosted by the wireless terminal to a core network node serving the second subscriber identity module, wherein said paging assistance information comprises information to be used to determine whether to page the second subscriber identity module when the first subscriber identity module is in connected mode and the second subscriber identity module is in idle mode and means for receiving, by the wireless terminal, a paging message from the core network node serving the second subscriber identity module in accordance with said paging assistance information when the first subscriber identity module is in connected mode and the second subscriber identity module is in idle mode. The apparatus of the third aspect may be a wireless terminal, or a control device configured to control the functioning thereof, possibly when installed therein.

According to a fourth aspect of the present invention, there is provided an apparatus comprising means for receiving from a first subscriber identity module hosted by a wireless terminal, by a core network node serving a second subscriber identity module hosted by the wireless terminal, paging assistance information associated with the second subscriber module, wherein said paging assistance information comprises information to be used to determine whether to page the second subscriber identity module when the first subscriber identity module is in connected mode and the second subscriber identity module is in idle mode, means for determining, based on said paging assistance information and a paging message to be transmitted, whether to page the second subscriber identity module or not when the first subscriber identity module is in connected mode and the second subscriber identity module is in idle mode and means for transmitting the paging message to the second subscriber identity module in accordance with said paging assistance information when the first subscriber identity module is in connected mode and the second subscriber identity module is in idle mode. The apparatus of the fourth aspect may be a core network node, or a control device configured to control the functioning thereof, possibly when installed therein.

According to a fifth aspect, there is provided a first method comprising transmitting, via a first subscriber identity module hosted by a wireless terminal, paging assistance information associated with a second subscriber identity module hosted by the wireless terminal to a core network node serving the second subscriber identity module, wherein said paging assistance information comprises information to be used to determine whether to page the second subscriber identity module when the first subscriber identity module is in connected mode and the second subscriber identity module is in idle mode and receiving, by the wireless terminal, a paging message from the core network node serving the second subscriber identity module in accordance with said paging assistance information when the first subscriber identity module is in connected mode and the second subscriber identity module is in idle mode.

According to a sixth aspect, there is provided a second method comprising receiving from a first subscriber identity module hosted by a wireless terminal, by a core network node serving a second subscriber identity module hosted by the wireless terminal, paging assistance information associated with the second subscriber module, wherein said paging assistance information comprises information to be used to determine whether to page the second subscriber identity module when the first subscriber identity module is in connected mode and the second subscriber identity module is in idle mode, determining, based on said paging assistance information and a paging message to be transmitted, whether to page the second subscriber identity module or not when the first subscriber identity module is in connected mode and the second subscriber identity module is in idle mode and transmitting the paging message to the second subscriber identity module in accordance with said paging assistance information when the first subscriber identity module is in connected mode and the second subscriber identity module is in idle mode.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program product comprising instructions which, when the program is executed by a computer, cause the computer to carry out the first method. According to a tenth aspect of the present invention, there is provided a computer program product comprising instructions which, when the program is executed by a computer, cause the computer to carry out the second method.

BRIEF DESCRIPTION OF THE DRAWINGS

FIG. 5 illustrates a flow graph of a first method in accordance with at least some example embodiments;

FIG. 6 illustrates a flow graph of a second method in accordance with at least some example embodiments.

EXAMPLE EMBODIMENTS

Example embodiments of the present invention provide enhancements related to operation of wireless terminals with multiple Subscriber Identity Modules, SIMS. More specifically, paging of such wireless terminals may be enhanced by providing paging assistance information. A wireless terminal hosting a first and a second SIM may have limited capabilities and hence decide to respond to some paging messages, but not all, when the first SIM is in connected mode and the second SIM is in idle mode. To inform Core Network, CN, nodes about the situation, the wireless terminal may transmit paging assistance information to the CN nodes, wherein said paging assistance information comprises information to be used to determine whether to page the second SIM when the first SIM is in connected mode and the second SIM is in idle mode.

The second SIM may be then paged by a CN node serving the second SIM when a paging message to be transmitted corresponds to said paging assistance information, but there is no need to page the second SIM if the paging message does not correspond to said paging assistance information. Thus, unnecessary paging can be avoided and resources of the network saved because the wireless terminal hosting the first and the second SIM can inform the CN node serving the second SIM for example about a list of paging types and/or services for which the wireless terminal will respond to paging of the second SIM and the CN node serving the second SIM can decide that it will page the second SIM for such paging types and/or services but not for others.

Figure 1:
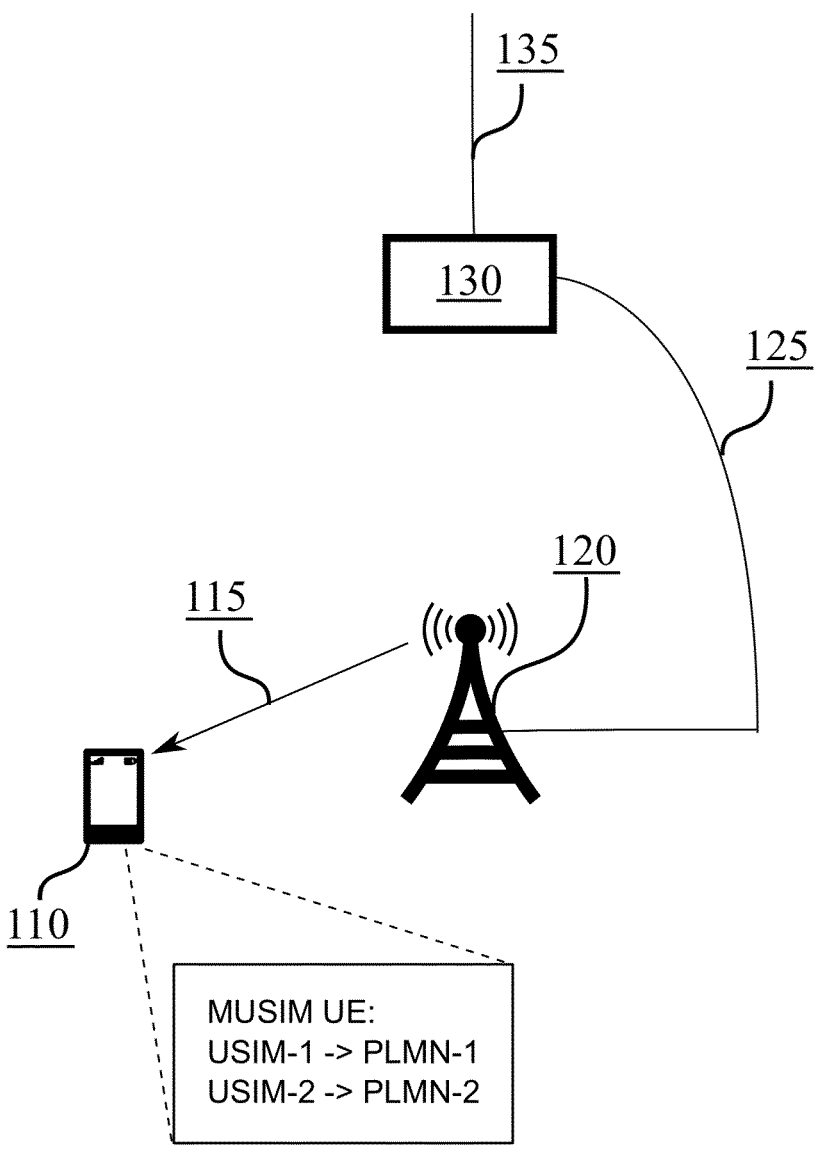
FIG. 1 illustrates an exemplary network scenario in accordance with at least some example embodiments.

FIG. 1 illustrates an exemplary network scenario in accordance with at least some example embodiments. According to the exemplary network scenario of FIG. 1, there may be a communication network comprising wireless terminal 110, Base Station, BS, 120, and CN 130. Wireless terminal 110 may be a terminal which hosts multiple SIMs. That is to say, wireless terminal 110 may comprise multiple SIMS. Wireless terminal 110 may comprise a first and a second SIM for example. CN 130 may then comprise a CN node serving the first SIM in a first Public Land Mobile Network, PLMN, and a CN node serving the second SIM in a second PLMN. In some example embodiments, the CN node serving the first SIM and the CN node serving the second SIM may be in the same PLMN though. The CN node serving the first SIM and the CN node serving the second SIM may be Access and Mobility management Functions, AMFs, for example.

Wireless terminal 110 may comprise, for example, a cellular terminal, such as a User Equipment, UE, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal.

In the exemplary network scenario of FIG. 1, wireless terminal 110 may communicate wirelessly with a cell of BS 120 via air interface 115. BS 120 may be considered as a serving BS for wireless terminal 110 and the cell of BS 120 may be a serving cell for wireless terminal 110. Air interface between wireless terminal 110 and BS 120 may be configured in accordance with a Radio Access Technology, RAT, which both wireless terminal 110 and base station 120 are configured to support. Examples of cellular RATs include Long Term Evolution, LTE, New Radio, NR, which may also be known as fifth generation, 5G, radio access technology and MulteFire. For example, in the context of LTE, BS 120 may be referred to as eNB while in the context of NR, BS 120 may be referred to as gNB. In any case, example embodiments of the present invention are not restricted to any particular wireless technology. Instead, example embodiments may be exploited in any system which supports wireless terminals with multiple SIMs. Example embodiments of the present invention may be exploited for SIMs in general, such as Universal SIMS, USIMs.

BS 120 may be connected, directly or via at least one intermediate node, with CN 130 via interface 125. CN 130 may be, in turn, coupled via interface 135 with another network (not shown in FIG. 1), via which connectivity to further networks may be obtained, for example via a world-wide interconnection network. BS 120 may be connected with at least one other BS as well via an inter-base station interface (not shown in FIG. 1), even though in some example embodiments the inter-base station interface may be absent. BS 120 may be connected, directly or via at least one intermediate node, with CN 130 or with another CN.

At least 3<sup>rd</sup> Generation Partnership Project, 3GPP, is working on enhancing support for multi-SIM wireless terminals. At least some of such wireless terminals can support multiple Receiver, RX, chains so such a wireless terminal with multiple SIMs can independently monitor paging for all SIMS, if the number of RX chains is at least as large as the number of SIMS. The goal of the 3GPP work, however, is mainly to address shortcomings that happen when the multi-SIM comprises one RX and one Transmitter, TX, or in general less RX/TX chains than a number of SIMS hosted by the multi-SIM wireless terminal. In such a case, the multi-SIM wireless terminal cannot independently access or monitor accesses. For instance, if a number of RX chains is less than the number of SIMs hosted by the multi-SIM wireless terminal, the multi-SIM wireless terminal may suffer from overlap of paging occasions and may need to abandon one PLMN to attend to procedures on another PLMN. Each SIM in the multi-SIM wireless terminal may represent an independent UE from the network point of view. Moreover, Radio Access Network, RAN, work item for Rel-17 for multi-SIM wireless terminals has an objective to enhance operations of the multi-SIM wireless terminals. Example embodiments of the present invention therefore provide means for enhancing operation of multi-SIM devices.

In some example embodiments, wireless terminal 110 may be referred to as a multi-SIM wireless terminal hosting, i.e., comprising, two or more SIMS subscribed to same or different PLMN. Said two or mode SIMS may share the same RF resources (i.e., TX and RX chains) of wireless terminal 110. For instance, wireless terminal 110 may be a Dual Sim Dual Standby, DSDS, device if one SIM can be in connected mode at a time. On the other hand, wireless terminal 110 may be a Dual Sim Dual Active, DSDA, device if both SIMs can be in connected mode while sharing RF resources (TX/RX chains) of wireless terminal 110.

Capabilities of wireless terminal 110 may also have an impact on the operation of multiple SIMS hosted by wireless terminal 110. For instance, if wireless terminal 110 comprises a single RX/TX chain, wireless terminal 110 can support one RX/TX operation towards one PLMN at a time. If wireless terminal 110 comprises two RX chains and one TX chain, wireless terminal 110 has a capability to receive two transmissions simultaneously but transmit one transmission at a time. If wireless terminal 110 comprises two RX chains and two TX chains, wireless terminal 110 has a capability to receive two transmissions simultaneously and transmit two transmissions at a time, i.e., DSDA support is possible because each SIM may be assigned to different RX and TX chains.

If wireless terminal 110 hosts multiple SIMS, it is possible that a serving cell for at least two SIMs hosted by wireless terminal 110 may be the same cell. For instance, if the serving cell supports RAN sharing and PLMNs of the at least two SIMs are supported by the same cell, the serving cell may be the same for the at least two SIMs. It is also possible that the at least two SIMS belong to the same PLMN and in such a case the serving cell may be the same PLMN and in such a case the serving cell may be the same for the at least two SIMS as well. Even if a home PLMN would be different for the at least two SIMs, a visited PLMN may be the same, and therefore the serving cell may be the same for the at least two SIMS. Hence it is desirable to enhance operation of wireless terminal 110 hosting multiple SIMS, especially if a number of SIMS hosted by wireless terminal 110 is more than a number of RX/TX chains of wireless terminal 110.

More specifically, challenges addressed by the present invention may be explained using wireless terminal 110 hosting, i.e., comprising, a single RX and a single TX chain as an example. In such a case wireless terminal 110 could support DSDS mode, but not DSDA mode. In DSDS mode wireless terminal 110 may be in connected mode via a first SIM hosted by wireless terminal 110, but a second SIM hosted by wireless terminal 110 needs to be in idle mode when the first SIM is in connected mode. If the second SIM would need to transition to connected mode, the first SIM would need to be transitioned from connected mode to idle mode.

Paging directed to the second SIM needs to be monitored to enable the transition of the second SIM from idle mode to connected mode for mobile terminated services. If the first SIM is already in connected mode, wireless terminal 110 may decide not to respond paging messages directed to the second SIM if the paging messages are meant for services which are not critical, i.e., not important enough to interrupt ongoing services related to the first SIM in connected mode.

However, the decision of wireless terminal 110 not to respond to the paging messages directed to the second SIM may cause unnecessary retransmissions of the paging messages, thereby leading to unnecessary consumption of resources of the network, because the network may send multiple paging retransmissions in multiple cells and with higher power as behaviour of wireless terminal 110 may be seen as a paging failure from a perspective of the network. Thus, the issue is that if wireless terminal 110 does not respond to paging, multiple retransmissions of the paging message may be done for nothing. Even the original transmission of the paging message was unnecessary if wireless terminal 110 had decided not to respond to such a paging message.

Example embodiments of the present invention therefore make it possible to reduce the number of unnecessary transmissions of paging messages, which enables better utilization of resources of the network. For instance, example embodiments of the present invention allow a RAN serving a connected mode SIM, such as the first SIM hosted by wireless terminal 110, and an idle mode SIM, such as the second SIM hosted by wireless terminal 110, to inform CN 130 so that CN 130 can page wireless terminal and the second SIM by taking into account paging assistance information provided by the first SIM. Said paging assistance information may be associated with the second SIM and to be used to determine whether to page the second SIM when the first SIM is in connected mode and the second SIM is in idle mode. The RAN serving the first SIM may refer to BS 120 for example. Example embodiments of the present invention may be used, e.g., for RAN sharing or intra-PLMN scenarios. The first SIM in connected mode may forward said paging assistance information associated with the second SIM in idle mode, received from the second SIM, to CN 130 for example when the first SIM and the second SIM camp on the same PLMN or when the first SIM and the second SIM camp on the same cell of a shared RAN, i.e., BS 120.

In some example embodiments, a CN node serving the second SIM in CN 130 may provide a routing identifier for said paging assistance information, wherein the routing identifier is to be used to forward said paging information to the CN node serving the second SIM. For instance, the routing identifier may be a Serving Temporary Mobile Subscriber Identity, S-TMSI, or another new identifier assigned by an AMF, to ensure that a temporary identity of the second SIM is uniquely identifiable globally and the RAN, i.e., BS 120, can route a S1-AP or NG-AP message to the CN node serving the second SIM. In case of the same PLMN, the routing identifier may comprise information for routing said paging assistance information to a correct CN. If the CN node serving the second SIM does not have connectivity to the RAN, wireless terminal 110 may also send additional information for forwarding the routing identifier to a CN node serving the first SIM.

In some example embodiments, the second SIM may transmit the routing identifier along with said paging assistance information to the first SIM and the first SIM may further forward the routing identifier to the CN node serving the first SIM, so that the CN node serving the first SIM may use the routing identifier to forward said paging assistance information to the CN node serving the second SIM. The routing identifier may be integrity protected with a Non-Access Stratum, NAS, key assigned by the CN node serving the second SIM. That is to say, the NAS key may be the NAS key of the second SIM. The NAS key may be transmitted as an additional parameter in Radio Resource Control, RRC, or Medium Access Control, MAC, control element in MAC signalling. The CN node serving the second SIM may authenticate the received paging assistance information associated with the second SIM using the NAS key, thereby enhancing security related to operation of wireless terminal 110 with multiple SIMS.

The RAN, such as BS 120, serving the first, connected mode SIM may receive said paging information associated with the second SIM from the first SIM, possibly along with the routing identifier. The RAN serving the first SIM may then forward said paging assistance information to the CN node serving the second SIM.

Said paging assistance information, to be used to determine whether to page the second SIM when the first SIM is in connected mode and the second SIM is in idle mode, may comprise a list of paging types for which wireless terminal 110 will respond to paging and/or a list of paging types for which wireless terminal 110 will not respond to paging while the first SIM is in connected mode. Said paging assistance information may be transmitted along with a paging identifier. In some example embodiments, the routing identifier may be the paging identifier. The routing identifier may be a 5G-S-TMSI or a different identifier. If the routing identifier is a 5G-S-TMSI, then the paging identifier, which is a 5G-S-TMSI as well, may be the same as the routing identifier.

Alternatively, or in addition, said paging assistance information may define services for which wireless terminal 110 will respond to paging and/or services for which wireless terminal 110 will not respond to paging while the first SIM is in connected mode. For example, wireless terminal 110 may respond to paging messages meant for voice-calls and critical traffic but not to other paging messages. If a paging message is meant for background or low priority traffic, wireless terminal 110 will not respond to the paging message.

In some example embodiments, the RAN may decide to forward said paging assistance information when a paging message is received. That is to say, instead of sending said paging assistance information at a time of connection setup and releasing said paging assistance information on connection release, the RAN may decide not to forward said paging assistance beforehand. If no paging is received, there is no signaling needed towards the CN node serving the second SIM. The RAN may forward said paging assistance information, e.g., in a new NG-AP message, when a received paging message corresponds to said paging assistance information. Thus, consumption of network resources may be further reduced, as unnecessary signalling can be avoided. The new NG-AP message which is transmitted to the CN node serving the second SIM in response to receiving the paging message may comprise the routing identifier and security keys provided by the second, idle mode SIM via the first, connected mode SIM.

In some example embodiments, said paging information associated with the second SIM may comprise a busy indication. The second SIM in idle mode may provide, via the first SIM and the RAN, the busy indication to the CN node serving the second SIM so that the CN node serving the second SIM can learn that the second SIM has received a paging message but wireless terminal 110 does not intend to serve the second SIM and the CN node serving the second SIM. That is to say, the busy indication may indicate that wireless terminal 110 will not respond to paging of the CN node serving the second SIM while the first SIM is in connected mode.

Upon receiving said paging assistance information associated with the second SIM, the CN node serving the second SIM may determine, based on said paging assistance information and a paging message to be transmitted, whether to page the second SIM or not when the first subscriber identity module is in connected mode and the second subscriber identity module is in idle mode. So if a service associated with the paging message to be transmitted was indicated in said paging assistance information as a service to which wireless terminal 110 will respond if paged, the CN node serving the second SIM may transmit the paging message. Otherwise the CN node serving the second SIM may decide not to transmit the paging message, because wireless terminal 110 would not respond to such a paging message. Unnecessary consumption of resources may be therefore avoided. Similarly, if a type of the paging message was in the list of paging types to which wireless terminal 110 will respond if paged, the CN node serving the second SIM may transmit the paging message. Otherwise, the CN node serving the second SIM may buffer the paging message and send the paging message once the first SIM has been transitioned from connected mode to idle mode.

So the CN node serving the second SIM may transmit the paging message to the second SIM in accordance with said paging assistance information when the first SIM is in connected mode and the second SIM is in idle mode, and the paging message corresponds to said paging assistance information. Consequently, the wireless terminal 110, i.e., the second SIM, may receive the paging message from the CN node serving the second SIM in accordance with said paging assistance information when the first SIM is in connected mode and the second SIM is in idle mode.

Wireless terminal 110 may determine, based on said paging assistance information and a received paging message, whether the paging message corresponds to said paging assistance information associated with the second SIM similarly as the CN node serving the second SIM. That is to say, wireless terminal 110 may check that it has indicated in said paging assistance information that it will respond to paging if the paging message is received, e.g., a paging type of the paging message was indicated in said paging assistance information as a paging type to which wireless terminal 110 will respond. Upon positive determination, wireless terminal 110 may transmit a response to the CN node serving the second SIM when the paging message corresponds to said paging assistance information. Otherwise, wireless terminal 110 may refrain from transmitting the response.

In some example embodiments, the RAN may transmit, after transmitting said paging assistance information, another message to the CN node serving the second SIM to reset paging assistance information after releasing an RRC connection of the first SIM. That is to say, the RAN may transmit an indication to the CN node serving the second SIM, the indication indicating that the first SIM has been transitioned from connected mode to idle mode. Upon receiving the indication, the CN serving the second SIM may start transmitting all paging messages to the second SIM, thereby resuming to normal operation to be able to serve the second SIM better.

Moreover, said another message transmitted to the CN node serving the second SIM may also comprise an indication about a cell to be paged for a next paging message directed towards the second SIM. Hence the paging process may be enhanced, as the RAN may propose a cell to be paged to the CN node serving the second SIM. The RAN likely has some information about the location and movement of wireless terminal 110. For instance, the RAN may indicate that the first cell to be paged is the same cell as the cell to which the first SIM was in connected mode. Hence the CN node serving the second SIM may transmit its first paging message to this cell instead of paging in a previous, last connected cell of the second SIM with a potential paging failure (outdated).

In some example embodiments, the traffic on the first SIM in connected mode may result in transmit or update paging assistance information associated with the second SIM according to a latest active traffic situation for example. Said paging assistance information associated with the second SIM may depend on a current traffic of the first SIM for example. If low priority traffic (below a threshold) is transmitted and/or received via the first SIM, said paging assistance information may indicate that wireless terminal 110 will respond to all paging messages, i.e., said paging information may indicate all priority and service types from the second SIM. If high priority traffic (above a threshold) is transmitted and/or received via the first SIM, said paging assistance information may indicate that wireless terminal 110 will respond to some paging messages but not all, i.e., said paging information may indicate some priority and service types from the second SIM. Thus, requirements of various services can be taken into account.

The first SIM may transmit, during a registration procedure, a capability indication indicating that wireless terminal 110, i.e., the first SIM, is capable of forwarding said paging assistance information. The CN nodes may need the capability indication to expect said paging assistance information.

In some example embodiments, forwarding of said paging assistance information may be extended so that any cell may perform said forwarding. For instance, forwarding of said paging assistance information associated with the second SIM by the first SIM may be extended for scenarios when the first SIM is in connected mode to any PLMN and to any cells in a PLMN. The first SIM may transmit a list of identities of CN nodes, such as PLMN identities, of all subscriber identity modules hosted by wireless terminal 110. The list may be transmitted to a CN node serving the first SIM. The CN node serving the first SIM may respond by transmitting a registration accept message, the registration accept message indicating whether the PLMN supports receiving said paging assistance information, and possibly the routing identifier, from CN or RAN nodes of the of the PLMNs of the other SIMS wireless terminal 110 indicated. That is to say, the registration accept message may be an acceptance message confirming that the CN node serving the first subscriber identity module supports exchanging paging assistance information with the listed CN nodes.

Thus, wireless terminal 110 may learn during the registration procedure whether the network supports forwarding of said paging assistance information and existence of agreements between the indicated PLMNs to exchange paging assistance information in general. Said learning may be beneficial at least if a RAN is shared between two PLMNs, as said two PLMNs may not allow reporting of information of RRC connection of the second SIM to another PLMN.

Figure 2:
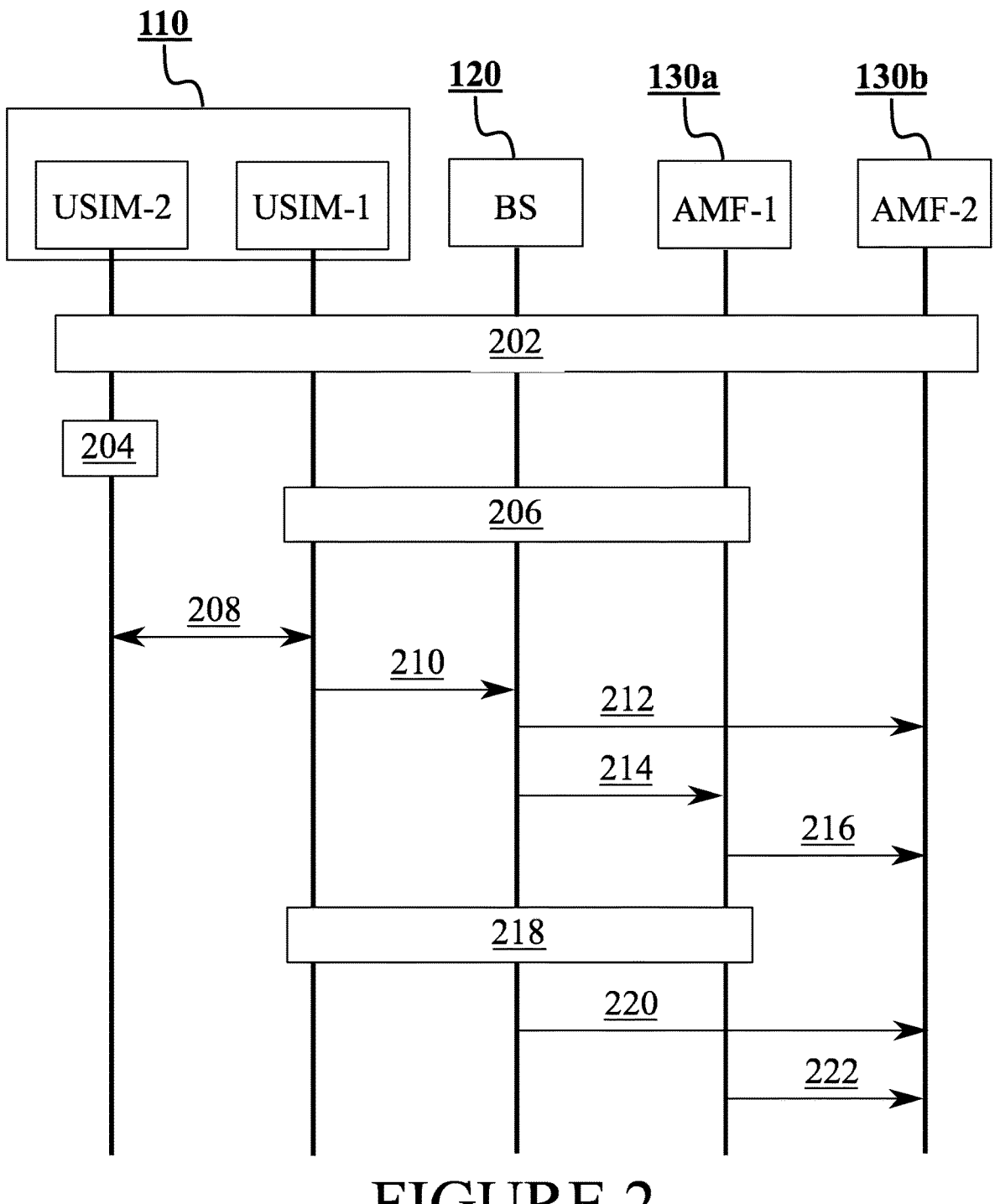
FIG. 2 illustrates a first process in accordance with at least some example embodiments.

FIG. 2 illustrates a first process in accordance with at least some example embodiments. On the vertical axes are disposed, from the left to the right, wireless terminal 110 hosting the first SIM and the second SIM, BS 120, CN node 130*a* serving the first SIM and CN node 130*b* serving the second SIM 130*b*. Time advances from the top towards the bottom.

At step 202, wireless terminal 110 may perform a registration procedure with CN node 130*a*. During the registration procedure wireless terminal 110 may transmit to CN node 130*a,* via the first SIM, the capability indication indicating that wireless terminal 110 is capable of forwarding said paging assistance information associated with the second SIM and/or the list of identities of CN nodes of all SIMS hosted by wireless terminal 110. Similarly, CN node 130*a* may indicate during the registration procedure that CN node 130*a* supports forwarding of said paging assistance information and/or confirm that CN node 130*a* supports exchanging paging assistance information with the listed CN nodes. In some example embodiments, CN node 130*b* may provide the routing identifier, for example if the routing identifier is different compared to the GUTI of the second SIM. If the routing identifier is the same as the GUTI of the second SIM, CN node 130*b* may also provide an indication that CN node 130*b* supports reception of said paging assistance information.

At step 204, the second SIM may be transitioned to idle mode. At step 206, the first SIM may be transitioned to connected mode. Said paging assistance information associated with the second SIM may be transmitted, at step 208, from the second SIM to the first SIM. At step 210, the first SIM may transmit said paging assistance information to BS 120, for example in RRC signalling.

If BS 120 supports forwarding of said paging assistance information to CN node 130*b* directly, BS 120 may transmit, at step 212, said paging assistance information (O2: NG-AP-Assistance-Info) to CN node 130*b*. If BS 120 does not support forwarding of said paging assistance information to CN node 130*b* directly, BS 120 may transmit, at step 214, said paging assistance information (01: NG-AP-Assistance-Info) to CN node 130*a* so that routing can be done via CN node 130*a*. At step 216, CN node 130*a* may transmit said paging assistance information (O1: Inter-AMF-signalling, NG-AP-Assistance-Info) to CN node 130*b*. Upon receiving said paging assistance information, CN node 130*b* may transmit a paging message to the second SIM in accordance with said paging assistance information when the first SIM is in connected mode and the second SIM is in idle mode.

At step 218, a RRC connection of the first SIM may be released by CN node 130*a*, i.e., the first SIM may be transitioned from connected mode to idle mode. Upon determining that the first SIM has been transitioned to idle mode, BS 120 may transmit, at step 220, an indication to CN node 130b, the indication indicating that the first SIM has been transitioned from connected mode to idle mode (O2: NG-AP-Paging-Assistance-Info (Release of paging filter)). Similarly, at step 222, CN node 130a may transmit the indication indicating that the first SIM has been transitioned from connected mode to idle mode (O1: Inter-AMF-signalling: NG-AP-Release-paging-assistance-information). Upon receiving the indication, CN node 130b may start transmitting all paging messages to the second SIM.

Figure 3:
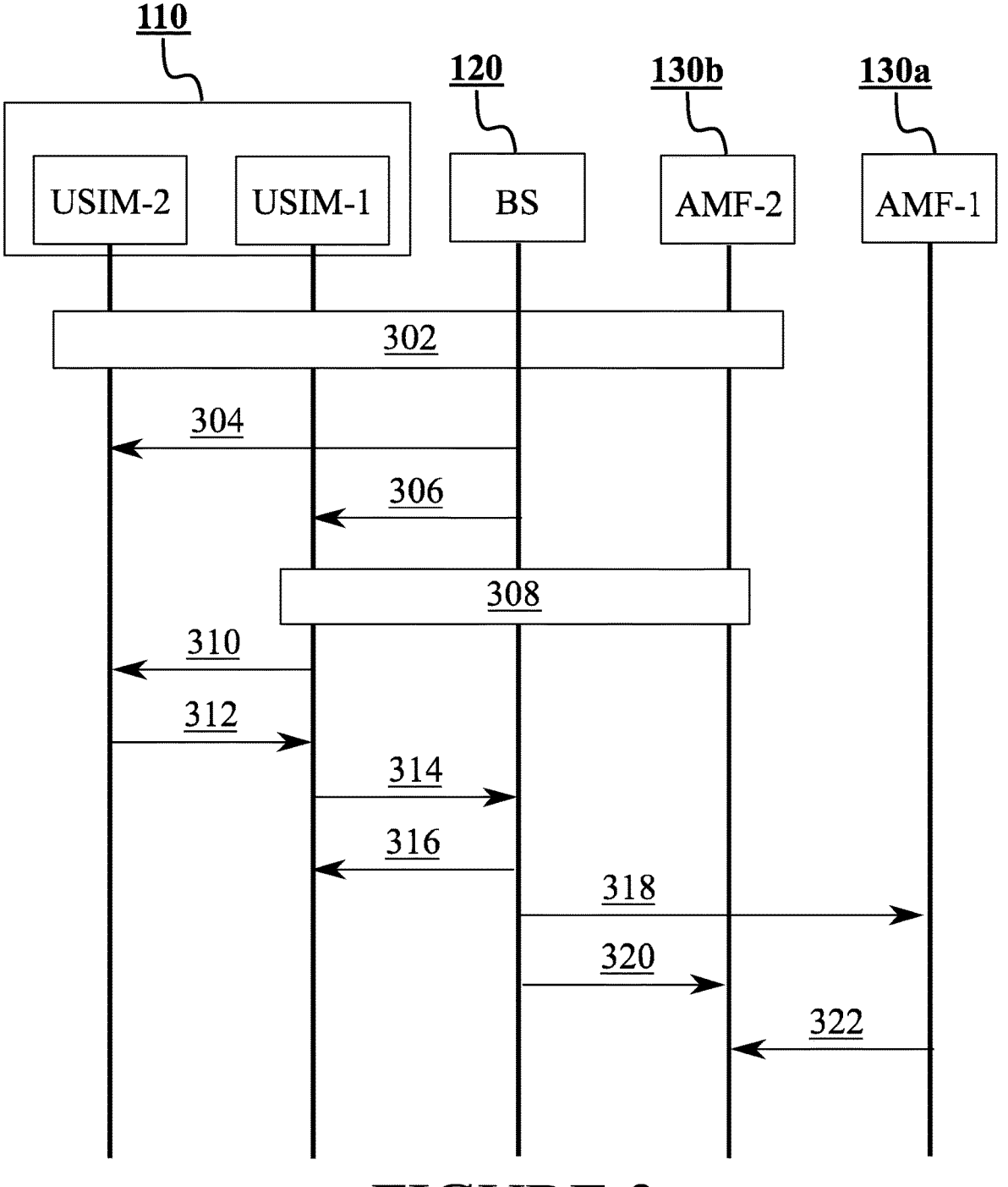
FIG. 3 illustrates a second process in accordance with at least some example embodiments.

FIG. 3 illustrates a second process in accordance with at least some example embodiments. On the vertical axes are disposed, from the left to the right, wireless terminal 110 hosting the first SIM and the second SIM, BS 120, CN node 130a serving the first SIM and CN node 130b serving the second SIM 130b. Time advances from the top towards the bottom.

At step 302, registration signalling may be performed to register the second SIM to CN node 130b during a registration procedure. The second SIM may be informed about the routing identifier, and possibly about integrity protection, for said paging assistance information associated with the second SIM. At step 304, BS 120 may transmit system information related to the RAN, such as RAN sharing information associated with a first and a second PLMN (System Information (RAN sharing info, PLMN-1, PLMN-2), to the second SIM. At step 306, BS 120 may transmit said system information related to the RAN to the first SIM as well. At step 308, the first SIM may be transitioned to connected mode, i.e., a RRC connection between the first SIM and BS 120 may be created.

At step 310, the first SIM may transmit a request message (Get-Routing-Info-for-paging-update (current-cell) to the second SIM, to request said paging assistance information associated with the second SIM. At step 312, the second SIM may respond by transmitting a response (Routing-Info (Routing identifier, integrity-protection-for-current-cell)) to the first SIM, the response comprising said paging assistance information and possibly the routing identifier and integrity protection information as well.

At step 314, the first SIM may transmit a message (RRC-Signalling (Routing identifier, integrity-protection-info for PLMN-2)) comprising said paging assistance information, and possibly the routing identifier and integrity protection information, to BS 120. Upon receiving said paging assistance information, CN node 130b may transmit a paging message to the second SIM in accordance with said paging assistance information when the first SIM is in connected mode and the second SIM is in idle mode.

At step 316, BS 120 may transmit a message indicating a release of the RRC connection to the first SIM. At step 318, BS 120 may transmit a context release message (NG-AP-Context-Release) to CN node 130b, if BS 120 has direct connectivity to CN node 130b. If BS 120 does not have direct connectivity to CN node 130b, BS 120 may transmit, at step 320, an indication (NG-AP-Paging-Info-update (First-cell-to-page, routing-identifier, integrity-protection-info)) to CN node 130a, the indication indicating that the first SIM has been transitioned from connected mode to idle mode. CN node 130 may then forward, e.g., via an AMF-AMF interface, the indication (NG-AP-Paging-Info-update (First-cell-to-page, routing-identifier, integrity-protection-info)) to CN node 130b. Upon receiving the indication, CN node 130b may start transmitting all paging messages to the second SIM.

Figure 4:
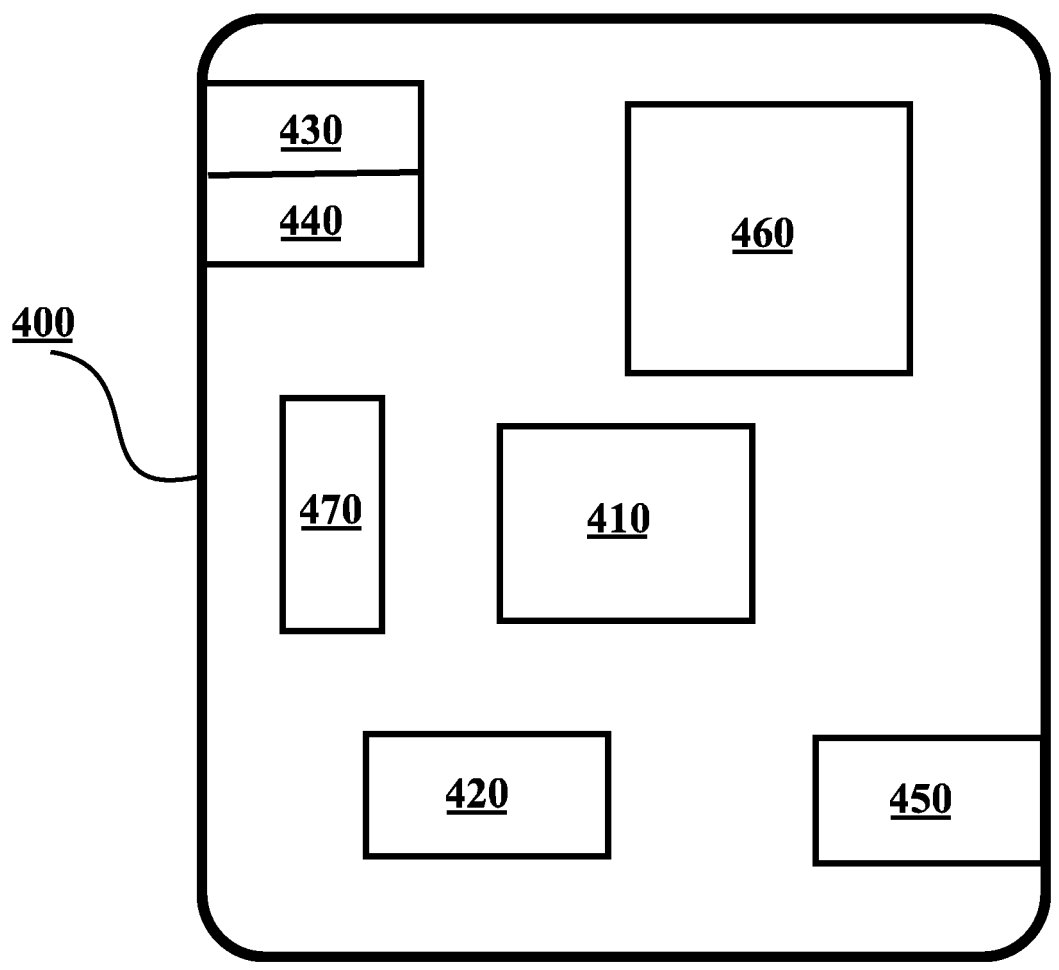
FIG. 4 illustrates an example apparatus capable of supporting at least some example embodiments.

FIG. 4 illustrates an example apparatus capable of supporting at least some example embodiments. Illustrated is apparatus 400, which may comprise, for example, wireless terminal 110 or CN node 130a serving the second SIM, or a control device configured to control the functioning thereof, possibly when installed therein. If apparatus 400 is wireless terminal 110, hosting the first SIM and the second SIM may mean that apparatus 400 comprises the first and the second, i.e., apparatus 400 is arranged such that the first and the second SIM may be inserted to apparatus 400. However, if apparatus 400 is a control device configured to control the functioning of wireless terminal 110, hosting the first SIM and the second SIM may mean controlling the first SIM and the second SIM, possibly within wireless terminal 110.

The first SIM and/or the second SIM may be physical SIM cards, inserted to wireless terminal 110 for multi-SIM operation. Alternatively, the first SIM and/or the second SIM may be embedded SIM cards, i.e., SIM cards which do not need to be physical cards but can be embedded to wireless terminal 110. In some example embodiments, the first SIM and/or the second SIM may be implemented as software SIMS. In such a case transmitting and receiving between the first and the second SIM may take place between codes/functions that implement the SIMs.

Comprised in apparatus 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core produced by Advanced Micro Devices Corporation. Processor 410 may comprise at least one Qualcomm Snapdragon and/or Intel Atom processor. Processor 410 may comprise at least one application-specific integrated circuit, ASIC. Processor 410 may comprise at least one field-programmable gate array, FPGA. Processor 410 may be means for performing method steps in apparatus 400. Processor 410 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Apparatus 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions config- ured to cause processor 410 to perform certain actions are stored in memory 420, and apparatus 400 overall is config- ured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to apparatus 400 but accessible to apparatus 400.

Apparatus 400 may comprise a transmitter 430. Apparatus 400 may comprise a receiver 440. Transmitter 430 and receiver 440 may be configured to transmit and receive, respectively, information in accordance with at least one cellular or non-cellular standard. Transmitter 430 may com- prise more than one transmitter. Receiver 440 may comprise more than one receiver. Transmitter 430 and/or receiver 440 may be configured to operate in accordance with Global System for Mobile communication, GSM, Wideband Code Division Multiple Access, WCDMA, Long Term Evolution, LTE, and/or 5G/NR standards, for example.

Apparatus 400 may comprise a Near-Field Communica- tion, NFC, transceiver 450. NFC transceiver 450 may sup- port at least one NFC technology, such as Bluetooth, Wibree or similar technologies.

Apparatus 400 may comprise User Interface, UI, 460. UI 460 may comprise at least one of a display, a keyboard, a touchscreen, a vibrator arranged to signal to a user by causing apparatus 400 to vibrate, a speaker and a micro- phone. A user may be able to operate apparatus 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Apparatus 400 may comprise or be arranged to accept a user identity module 470. User identity module 470 may comprise, for example, a Subscriber Identity Module, SIM, card installable in apparatus 400. A user identity module 470 may comprise information identifying a subscription of a user of apparatus 400. A user identity module 470 may comprise cryptographic information usable to verify the identity of a user of apparatus 400 and/or to facilitate encryption of communicated information and billing of the user of apparatus 400 for communication effected via appa- ratus 400.

Processor 410 may be furnished with a transmitter arranged to output information from processor 410, via electrical leads internal to apparatus 400, to other devices comprised in apparatus 400. Such a transmitter may com- prise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to apparatus 400, from other devices comprised in apparatus 400. Such a receiver may comprise a serial bus receiver arranged to, for example, receive information via at least one electrical lead from receiver 440 for processing in processor 410. Alternatively to a serial bus, the receiver may comprise a parallel bus receiver.

Apparatus 400 may comprise further devices not illus- trated in FIG. 4. For example, where apparatus 400 com- prises a smartphone, it may comprise at least one digital camera. Some devices 400 may comprise a back-facing camera and a front-facing camera, wherein the back-facing camera may be intended for digital photography and the front-facing camera for video telephony. Apparatus 400 may comprise a fingerprint sensor arranged to authenticate, at least in part, a user of apparatus 400. In some example embodiments, apparatus 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads inter- nal to apparatus 400 in a multitude of different ways. For example, each of the aforementioned devices may be sepa- rately connected to a master bus internal to apparatus 400, to allow for the devices to exchange information. However, as the skilled person will appreciate, this is only one example and depending on the example embodiment various ways of interconnecting at least two of the aforementioned devices may be selected without departing from the scope of the example embodiments.

FIG. 5 is a flow graph of a first method in accordance with at least some example embodiments. The phases of the illustrated first method may be performed by wireless ter- minal 110, or by a control device configured to control the functioning thereof, possibly when installed therein.

The first method may comprise, at step 510, transmitting, via a first subscriber identity module hosted by a wireless terminal, paging assistance information associated with a second subscriber identity module hosted by the wireless terminal to a core network node serving the second sub- scriber identity module, wherein said paging assistance information comprises information to be used to determine whether to page the second subscriber identity module when the first subscriber identity module is in connected mode and the second subscriber identity module is in idle mode. The first method may also comprise, at step 520, receiving, by the wireless terminal, a paging message from the core network node serving the second subscriber identity module in accordance with said paging assistance information when the first subscriber identity module is in connected mode and the second subscriber identity module is in idle mode.

FIG. 6 is a flow graph of a second method in accordance with at least some example embodiments. The phases of the illustrated second method may be performed by CN node 130*a* serving the second SIM, or by a control device configured to control the functioning thereof, possibly when installed therein.

The second method may comprise, at step 610, receiving from a first subscriber identity module hosted by a wireless terminal, via by a core network node serving a second subscriber identity module hosted by the wireless terminal, paging assistance information associated with the second subscriber module, wherein said paging assistance informa- tion comprises information to be used to determine whether to page the second subscriber identity module when the first subscriber identity module is in connected mode and the second subscriber identity module is in idle mode. The second method may also comprise, at step 620, determining, based on said paging assistance information and a paging message to be transmitted, whether to page the second subscriber identity module or not when the first subscriber identity module is in connected mode and the second subscriber identity module is in idle mode. Finally, the second method may comprise, at step 630, transmitting the paging message to the second subscriber identity module in accordance with said paging assistance information when the first subscriber identity module is in connected mode and the second subscriber identity module is in idle mode.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, wireless terminal 110 or CN node 130*a* serving the second SIM, may comprise means for carrying out the example embodiments described above and any combination thereof In an example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an example embodiment, an apparatus, such as, for example, wireless terminal 110 or CN node 130*a* serving the second SIM, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

Example embodiments of the present invention find industrial application at least in cellular communication networks, for example in 3GPP networks wherein it is desirable to enhance operation related to wireless terminals with multiple SIMs.

ACRONYMS LIST

3GPP 3rd Generation Partnership Project
AMF Access and Mobility Management Function
BS Base Station
CN Core Network
CORESET Control Resource Set
DSDA Dual Sim Dual Active
DSDA Dual Sim Dual Standby
GSM Global System for Mobile communication
GUTI Globally Unique Temporary Identifier
IoT Internet of Things
LTE Long-Term Evolution
M2M Machine-to-Machine
MAC Medium Access Control
NAS Non-Access Stratum
NFC Near-Field Communication
NR New Radio
PLMN Public Land Mobile Network
RAN Radio Access Network
RAT Radio Access Technology
RRC Radio Resource Control
RX Receiver
S-TMSI Serving Temporary Mobile Subscriber Identity
SIM Subscriber Identity Module
TX Transmitter
UE User Equipment
UI User Interface USIM Universal SIM
WCDMA Wideband Code Division Multiple Access

REFERENCE SIGNS LIST

| 110 | User Equipment |
|---|---|
| 115 | Air interface |
| 120 | Base Station |
| 125, 135 | Wired interfaces |
| 130 | CN |
| 130a, 130b | CN nodes |
| 202-222 | Steps in the process of FIG. 2 |
| 302-322 | Steps in the process of FIG. 3 |
| 400-470 | Structure of the apparatus of FIG. 4 |
| 510-530 | Phases of the first method in FIG. 5 |
| 610-630 | Phases of the second method in FIG. 6 |

The invention claimed is:

1. An apparatus, comprising:

at least one processor; and at least one memory storing computer program code that, when executed by the at least one processor, causes the apparatus at least to:

transmit, via a first subscriber identity module hosted by the apparatus, paging assistance information associated with a second subscriber identity module hosted by the apparatus to a core network node serving the second subscriber identity module, wherein said paging assistance information comprises information to be used to determine whether to page the second subscriber identity module when the first subscriber identity module is in connected mode and the second subscriber identity module is in idle mode; and receive a paging message from the core network node serving the second subscriber identity module in accordance with said paging assistance information when the first subscriber identity module is in connected mode and the second subscriber identity module is in idle mode.

2. The apparatus according to claim 1, wherein said paging assistance information comprises a list of paging types for which the apparatus will respond to paging and/or a list of paging types for which the apparatus will not respond to paging.

3. The apparatus according to claim 1, wherein said paging assistance information comprises services for which the apparatus will respond to paging and/or services for which the apparatus will not respond to paging.

4. The apparatus according to claim 1, wherein the at least one memory and the computer program code are further configured to, with the at least one processing core, cause the apparatus at least to perform:

start responding to all paging messages upon determining that the first subscriber identity module has been transitioned from connected mode to idle mode.

5. The apparatus according to claim 1, wherein a routing identifier of the second subscriber identity module is transmitted along with said paging assistance information, wherein the routing identifier is to be used to forward said paging assistance information to the core network node serving the second subscriber identity module.

6. The apparatus according to claim 1, wherein the at least one memory and computer program code are further configured, with the at least one processor, to cause the apparatus to:

transmit, during a registration procedure, a capability indication indicating that the apparatus is capable of transmitting said paging assistance information.

7. The apparatus according to claim 1, wherein the at least one memory and computer program code are further configured, with the at least one processor, to cause the apparatus to:

transmit, during a registration procedure, a list of identities of core network nodes of all subscriber identity modules hosted by the apparatus to a core network node serving the first subscriber identity module; and receive an acceptance message confirming that the core network node serving the first subscriber identity module supports exchanging paging assistance information with the listed core network nodes, wherein the acceptance message comprises a routing identifier for each of the listed core network nodes.

8. The apparatus according to claim 1, wherein the at least one memory and computer program code are further configured, with the at least one processor, to cause the apparatus to:

receive, by the first subscriber identity module, said paging assistance information associated with the second subscriber identity module from the second subscriber identity module.

9. An apparatus comprising:

at least one processor; and at least one memory storing computer program code that, when executed by the at least one processor, causes the apparatus at least to receive, from a first subscriber identity module hosted by a wireless terminal, paging assistance information associated with a second subscriber module hosted by the wireless terminal, wherein said paging assistance information comprises information to be used to determine whether to page the second subscriber identity module when the first subscriber identity module is in connected mode and the second subscriber identity module is in idle mode;

determine, based on said paging assistance information and a paging message to be transmitted, whether to page the second subscriber identity module or not when the first subscriber identity module is in connected mode and the second subscriber identity module is in idle mode; and transmit the paging message to the second subscriber identity module in accordance with said paging assistance information when the first subscriber identity module is in connected mode and the second subscriber identity module is in idle mode.

10. The apparatus according to claim 9, wherein said paging assistance information comprises a list of paging types for which the wireless terminal will respond to paging and/or a list of paging types for which the wireless terminal will not respond to paging.

11. The apparatus according to claim 9, wherein said paging assistance information comprises services for which the wireless terminal will respond to paging and/or services for which the wireless terminal will not respond to paging.

12. The apparatus according to claim 9, wherein the at least one memory and computer program code are further configured, with the at least one processor, to cause the apparatus to:

start transmitting all paging messages to the second subscriber identity module upon receiving an indication indicating that the first subscriber identity module has been transitioned from connected mode to idle mode.

13. A method, comprising:

transmitting, via a first subscriber identity module hosted by a wireless terminal, paging assistance information associated with a second subscriber identity module hosted by the wireless terminal to a core network node serving the second subscriber identity module, wherein said paging assistance information comprises information to be used to determine whether to page the second subscriber identity module when the first subscriber identity module is in connected mode and the second subscriber identity module is in idle mode; and receiving, by the wireless terminal, a paging message from the core network node serving the second subscriber identity module in accordance with said paging assistance information when the first subscriber identity module is in connected mode and the second subscriber identity module is in idle mode.

14. The method according to claim 13, wherein said paging assistance information comprises a list of paging types for which the wireless terminal will respond to paging and/or a list of paging types for which the apparatus will not respond to paging.

15. The method according to claim 13, wherein said paging assistance information comprises services for which the wireless terminal will respond to paging and/or services for which the apparatus will not respond to paging.

16. The method according to claim 13, further comprising:

starting responding to all paging messages received from the core network node serving the second subscriber identity module upon determining that the first subscriber identity module has been transitioned from connected mode to idle mode.

17. The method according to claim 13, wherein a routing identifier of the second subscriber identity module is transmitted along with said paging assistance information, wherein the routing identifier is to be used to forward said paging assistance information to the core network node serving the second subscriber identity module.

18. The method according to claim 13, further comprising:

transmitting, during a registration procedure, a capability indication indicating that the wireless terminal is capable of transmitting said paging assistance information.

19. The method according to claim 13, further comprising:

transmitting, during a registration procedure, a list of identities of core network nodes of all subscriber identity modules hosted by the wireless terminal to a core network node serving the first subscriber identity module; and receiving an acceptance message confirming that the core network node serving the first subscriber identity module supports exchanging paging assistance information with the listed core network nodes, wherein the acceptance message comprises a routing identifier for each of the listed core network nodes.

20. The method according to claim 13, further comprising:

receiving, by the first subscriber identity module, said paging assistance information associated with the second subscriber identity module from the second subscriber identity module.

21. A non-transitory computer readable medium having stored thereon a set of computer readable instructions that, when executed by an apparatus, causes the apparatus to at least perform the method of claim 13.

22. A method, comprising:

receiving from a first subscriber identity module hosted by a wireless terminal, by a core network node serving a second subscriber identity module hosted by the wireless terminal, paging assistance information associated with the second subscriber module, wherein said paging assistance information comprises information to be used to determine whether to page the second subscriber identity module when the first subscriber identity module is in connected mode and the second subscriber identity module is in idle mode;

determining, based on said paging assistance information and a paging message to be transmitted, whether to page the second subscriber identity module or not when the first subscriber identity module is in connected mode and the second subscriber identity module is in idle mode; and transmitting the paging message to the second subscriber identity module in accordance with said paging assistance information when the first subscriber identity module is in connected mode and the second subscriber identity module is in idle mode.

23. The method according to claim 22, wherein said paging assistance information comprises a list of paging types for which the wireless terminal will respond to paging and/or a list of paging types for which the apparatus will not respond to paging.

24. The method according to claim 22, wherein said paging assistance information comprises services for which the wireless terminal will respond to paging and/or services for which the wireless terminal will not respond to paging.

25. The method according to claim 22, further comprising:

starting transmitting all paging messages to the second subscriber identity module upon receiving an indication indicating that the first subscriber identity module has been transitioned from connected mode to idle mode.

26. A non-transitory computer readable medium having stored thereon a set of computer readable instructions that, when executed by an apparatus, causes the apparatus to at least perform the method of claim 22.

\* \* \* \* \*